US012084956B2

(12) United States Patent
Aljedaani et al.

(10) Patent No.: US 12,084,956 B2
(45) Date of Patent: Sep. 10, 2024

(54) METHOD AND SYSTEM FOR PROCESSING WELL LOG DATA FROM MULTIPLE WELLS USING MACHINE LEARNING

(71) Applicant: SAUDI ARABIAN OIL COMPANY, Dhahran (SA)

(72) Inventors: Abdulrahman Aljedaani, Dhahran (SA); Klemens Katterbauer, Dhahran (SA); Alberto Marsala, Venice (IT)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1024 days.

(21) Appl. No.: 17/028,321

(22) Filed: Sep. 22, 2020

(65) Prior Publication Data

US 2022/0090481 A1 Mar. 24, 2022

(51) Int. Cl.
*E21B 44/00* (2006.01)
*E21B 7/04* (2006.01)
(Continued)

(52) U.S. Cl.
CPC ............. *E21B 44/00* (2013.01); *E21B 7/04* (2013.01); *E21B 21/08* (2013.01);
(Continued)

(58) Field of Classification Search
CPC . E21B 44/00; E21B 7/04; E21B 21/08; E21B 47/0025; E21B 49/003;
(Continued)

(56) References Cited

U.S. PATENT DOCUMENTS 5,812,068 A  9/1998 Wisler et al.
6,377,050 B1 4/2002 Chemali et al.
(Continued)

FOREIGN PATENT DOCUMENTS

CN    111206920 A    5/2020
WO    2020/191360 A1  9/2020

OTHER PUBLICATIONS

Kanfar R, Shaikh O, Yousefzadeh M, Mukerji T. Real-time well log prediction from drilling data using deep learning. InInternational Petroleum Technology Conference Jan. 1, 20203 (p. D031S064R003). IPTC. (Year: 2020).*

(Continued)

*Primary Examiner* — Eunhee Kim
(74) *Attorney, Agent, or Firm* — Osha Bergman Watanabe & Burton LLP

(57) ABSTRACT

A method may include obtaining well log data regarding a geological region of interest. The well log data may correspond to logging-while-drilling (LWD) measurements or measurement-while-drilling (MWD) measurements acquired from various wellbores. The method may further include generating image data regarding the geological region of interest using the well log data and a recurrent neural network. The method may further include determining a drilling parameter for a wellbore among the wellbores in real-time using the image data. The drilling parameter may be determined while the well log data is being acquired in the wellbore. The method may further include transmitting, based on the drilling parameter, a command to a drilling system coupled to the wellbore.

15 Claims, 8 Drawing Sheets

(51) Int. Cl.

| | |
|---|---|
| *E21B 21/08* | (2006.01) |
| *E21B 47/002* | (2012.01) |
| *E21B 49/00* | (2006.01) |
| *G01V 1/40* | (2006.01) |
| *G01V 3/20* | (2006.01) |
| *G05B 13/02* | (2006.01) |
| *G06N 3/044* | (2023.01) |
| *G06N 3/045* | (2023.01) |
| *G06N 3/08* | (2023.01) |

(52) U.S. Cl.
CPC ........ *E21B 47/0025* (2020.05); *E21B 49/003* (2013.01); *G01V 1/40* (2013.01); *G01V 3/20* (2013.01); *G05B 13/027* (2013.01); *G06N 3/044* (2023.01); *G06N 3/045* (2023.01); *G06N 3/08* (2013.01); *E21B 2200/20* (2020.05); *E21B 2200/22* (2020.05); *G01V 2210/1429* (2013.01); *G01V 2210/324* (2013.01)

(58) Field of Classification Search
CPC ... E21B 2200/20; E21B 2200/22; G01V 1/40; G01V 3/20; G01V 2210/1429; G01V 2210/324; G01V 3/38; G01V 2210/6169; G01V 2210/72; G01V 11/00; G05B 13/027; G06N 3/044; G06N 3/045; G06N 3/006; G06N 7/01; G06N 3/08
See application file for complete search history.

(56) References Cited

U.S. PATENT DOCUMENTS

| | | |
|---|---|---|
| 6,909,667 B2 | 6/2005 | Shah et al. |
| 7,129,477 B2 | 10/2006 | Schneider et al. |
| 2005/0267719 A1 | 12/2005 | Foucault |
| 2006/0161406 A1 | 7/2006 | Kelfoun |
| 2011/0232967 A1 | 9/2011 | Williams |
| 2015/0129306 A1 | 5/2015 | Coffman et al. |
| 2015/0300150 A1 | 10/2015 | Burkay |
| 2015/0300151 A1 | 10/2015 | Mohaghegh |
| 2018/0334896 A1 | 11/2018 | Samuel et al. |
| 2019/0197200 A9 | 6/2019 | Williams |
| 2020/0126386 A1* | 4/2020 | Michalopulos ........ G08B 21/02 |
| 2020/0190966 A1 | 6/2020 | Donderici et al. |
| 2021/0326721 A1* | 10/2021 | Zhang ...................... G06N 5/04 |
| 2022/0010675 A1* | 1/2022 | Yin ......................... G06N 3/084 |
| 2022/0170359 A1* | 6/2022 | Boualleg ................ G06N 20/20 |

OTHER PUBLICATIONS

Amiriparian, Shahin, N. Cummins, S. Julka, and Björn Schuller. "Deep convolutional recurrent neural network for rare acoustic event detection." In Proc. DAGA, pp. 1522-1525. 2018. (Year: 2018).*

Nasir, Yusuf. "Deep reinforcement learning for field development optimization." arXiv preprint arXiv:2008. 12627 (2020). Aug 5. (Year: 2020).*

International Search Report and Written Opinion of the International Searching Authority issued in corresponding International Application No. PCT/US2021/051515, mailed on Jan. 13, 2022 (19 pages).

Cao Dingzhou et al: "SPE-196228-MS; Developing an Integrated Real-Time Drilling Ecosystem to Provide a One-Stop Solution for Drilling Monitoring and Optimization", SPE Annual Technical Conference and Exhibition, Oct. 1, 2019, pp. 1-20, XP055876098 (20 pages).

Dongxiao Zhang et al.: "Synthetic well logs generation via Recurrent Neural Networks", Petroleum Exploration and Development Online, Aug. 1, 2018, pp. 629-639, XP055636040 (11 pages).

Wu, Yongkang et al., "A New Logging-While-Drilling Method for Resistivity Measurement in Oil-Based Mud", Sensors, MDPI, vol. 20, No. 1075, doi:10.3390/s20041075, Feb. 2020 (16 pages).

* cited by examiner

METHOD AND SYSTEM FOR PROCESSING WELL LOG DATA FROM MULTIPLE WELLS USING MACHINE LEARNING

BACKGROUND

A subsurface formation may be determined using various measurements obtained through logging tools. For example, these measurements may be used to calculate porosity, permeability, and other properties of a reservoir formation. However, in many situations, logging tool measurements may prove inaccurate due to interference and unique conditions within a wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, well log data regarding a geological region of interest. The well log data correspond to logging-while-drilling (LWD) measurements or measurement-while-drilling (MWD) measurements acquired from various wellbores. The method further includes generating, by the computer processor, image data regarding the geological region of interest using the well log data and a recurrent neural network. The method further includes determining, by the computer processor, a drilling parameter for a wellbore among the wellbores in real-time using the image data. The drilling parameter is determined while the well log data is being acquired in the wellbore. The method further includes transmitting, by the computer processor and based on the drilling parameter, a command to a drilling system coupled to the wellbore.

In general, in one aspect, embodiments relate to a system that includes a logging system coupled to various logging tools, a drilling system coupled to the logging system and a wellbore, and a reservoir simulator including a computer processor coupled to the logging system and the drilling system. The reservoir simulator obtains well log data regarding a geological region of interest. The well log data may correspond to logging-while-drilling (LWD) measurements or measurement-while-drilling (MWD) measurements acquired from various wellbores including the wellbore. The reservoir simulator generates image data regarding the geological region of interest using the well log data and a recurrent neural network. The reservoir simulator determining a drilling parameter for the wellbore in real-time using the image data. The drilling parameter is determined while the well log data is being acquired in the wellbore. The reservoir simulator transmits, based on the drilling parameter, a command to the drilling system coupled to the wellbore.

In general, in one aspect, embodiments relate to a non-transitory computer readable medium storing instructions executable by a computer processor. The instructions obtain well log data regarding a geological region of interest. The well log data correspond to logging-while-drilling (LWD) measurements or measurement-while-drilling (MWD) measurements acquired from various wellbores. The instructions further generate image data regarding the geological region of interest using the well log data and a recurrent neural network. The instructions further determine a drilling parameter for a wellbore among the wellbores in real-time using the image data. The drilling parameter is determined while the well log data is being acquired in the wellbore. The instructions further transmit, based on the drilling parameter, a command to a drilling system coupled to the wellbore.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for dual well logging techniques for evaluating formations in the subsurface. For example, many challenges may be experienced during logging-while-drilling (LWD) or measurement-while-drilling (MWD) due to limited information regarding heterogeneity among different rock formations. Accordingly, some embodiments use dual or multiple logging techniques for acquiring measurements substantially simultaneously or time-lagged among different drilled wells. For illustration, by accounting for similar interference in sensing signals among different logging tools at different wells, artificial intelligence may improve drilling performance as well as images acquired from the logging measurements. More specifically, a recurrent neural network, such as a long short-term memory (LSTM) network, may use the time-series nature of logging data to generate adjusted well log data (e.g., well log data that has geological noise removed) as well as drilling parameters or logging parameters to optimize in real-time a drilling operation or logging operation, respectively. Therefore, some embodiments of the disclosure may improve geosteering, well placement, and reservoir contact zone penetration.

Figure 1:
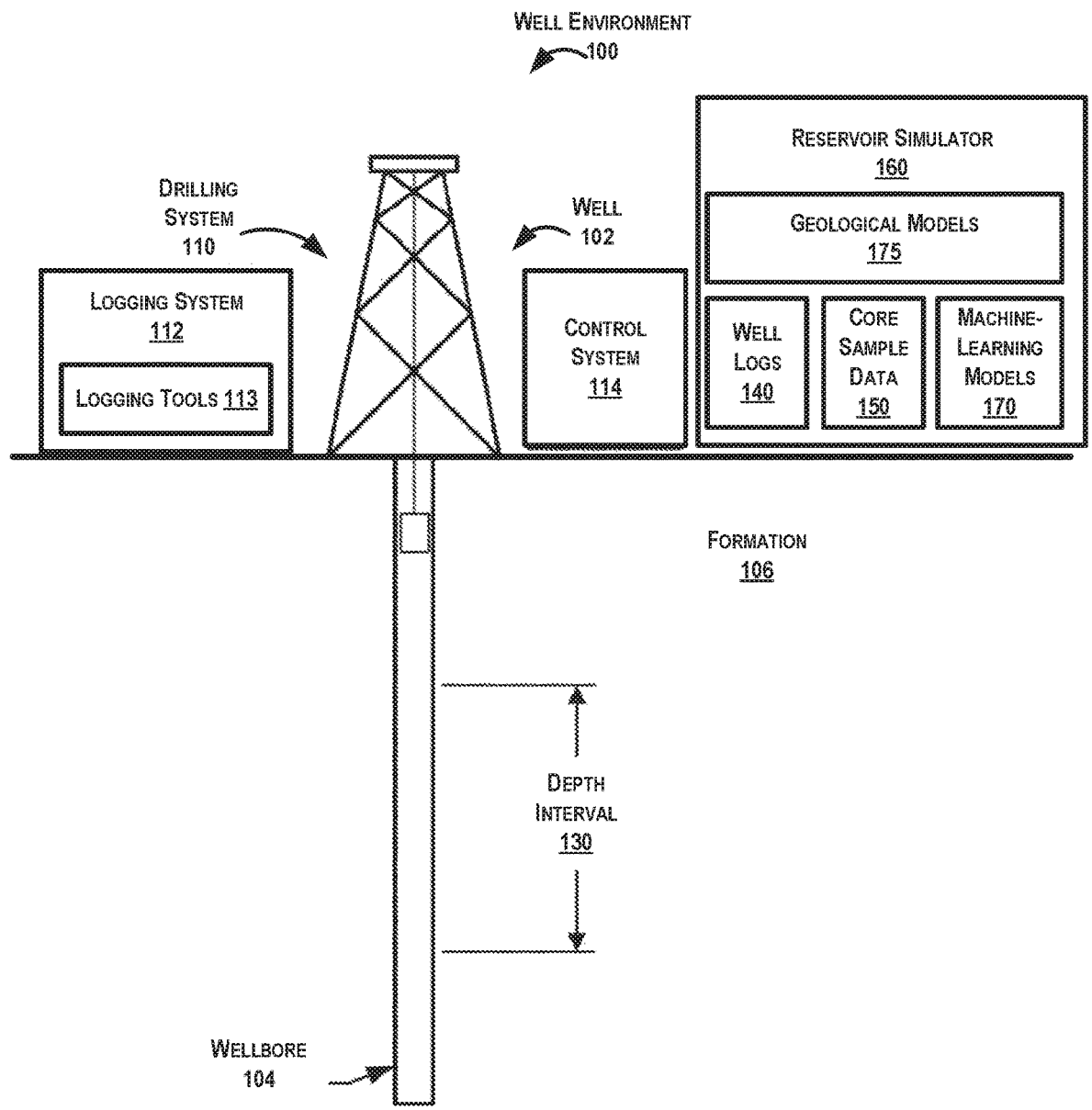
FIGS. 1, 2A, 2B, and 3 show systems in accordance with one or more embodiments.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, density, water saturation, and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir simulator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. A logging system may be similar to a control system with a specific focus on managing one or more logging tools.

Turning to the reservoir simulator (160), a reservoir simulator (160) may include hardware and/or software with functionality for storing and analyzing well logs (140), core sample data (150), seismic data, and/or other types of data to generate and/or update one or more geological models (175). Geological models may include geochemical or geomechanical models that describe structural relationships within a particular geological region. While the reservoir simulator (160) is shown at a well site, in some embodiments, the reservoir simulator (160) may be remote from a well site. In some embodiments, the reservoir simulator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir simulator (160) may include a computer system that is similar to the computer system (702) described below with regard to FIG. 7 and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., a targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, density, water saturation, and the like. The resulting logging measurements may be stored and/or processed, for example, by the control system (114), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs or acoustic logs. In general, acoustic waves may travel faster through high-density shales than through lower-density sandstones. Likewise, density logging may also determine density measurements or porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores. In some embodiments, gamma ray logging is used to measure naturally occurring gamma radiation to characterize rock or sediment regions within a wellbore. In particular, different types of rock may emit different amounts and different spectra of natural gamma radiation. For example, gamma ray logs may distinguish between shales and sandstones/carbonate rocks because radioactive potassium may be common to shales. Likewise, the cation exchange capacity of clay within shales also results in higher absorption of uranium and thorium further increasing the amount of gamma radiation produced by shales.

Figure 2A:
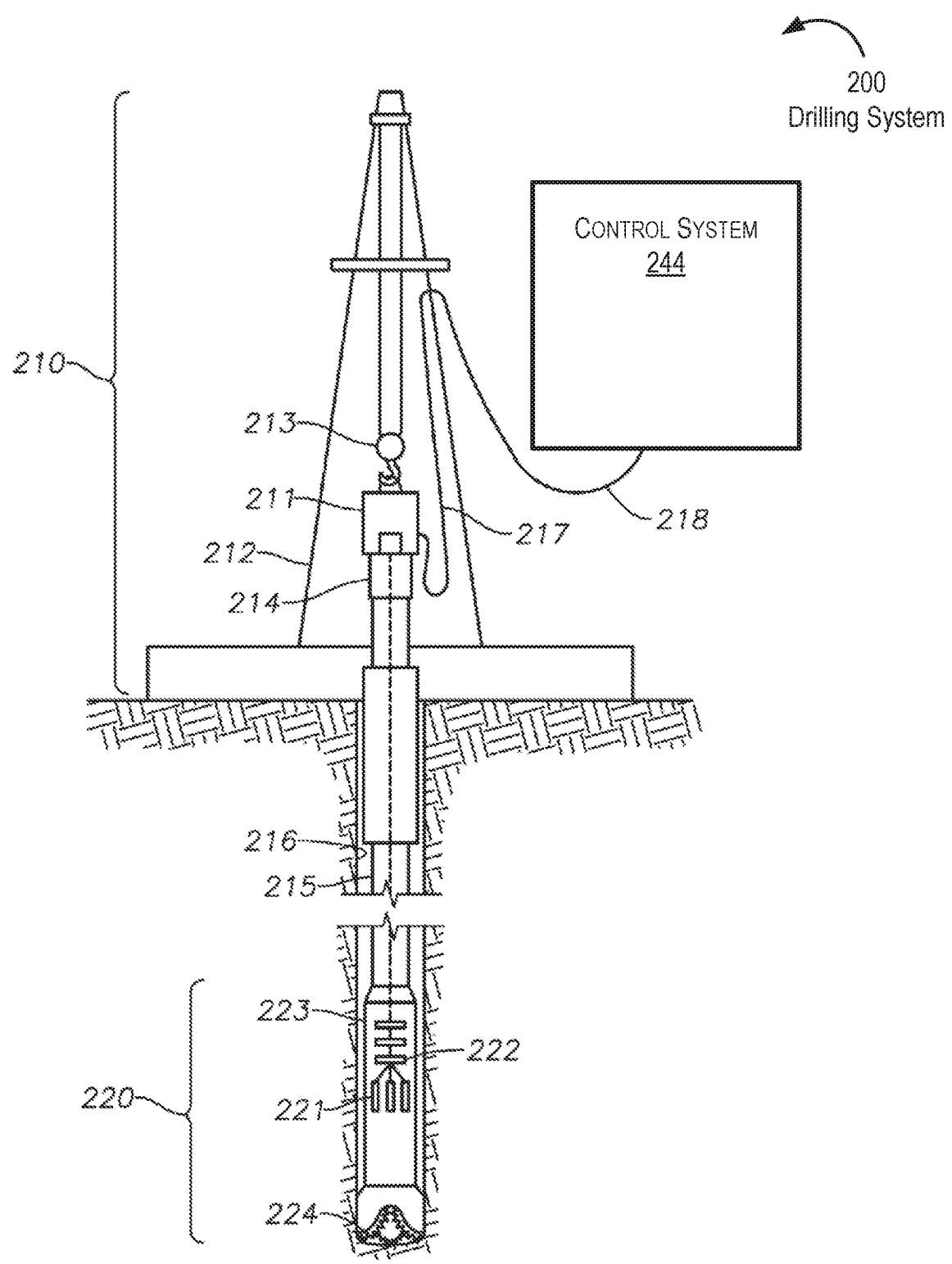

As further shown in FIG. 2A, sensors (221) may be included in a sensor assembly (223), which is positioned adjacent to a drill bit (224) and coupled to the drill string (215). Sensors (221) may also be coupled to a processor assembly (223) that includes a processor, memory, and an analog-to-digital converter (222) for processing sensor measurements. For example, the sensors (221) may include acoustic sensors, such as accelerometers, measurement microphones, contact microphones, and hydrophones. Likewise, the sensors (221) may include other types of sensors, such as transmitters and receivers to measure resistivity, gamma ray detectors, etc. The sensors (221) may include hardware and/or software for generating different types of well logs (such as acoustic logs or density logs) that may provide well log data about a wellbore, including porosity of wellbore sections, gas saturation, bed boundaries in a geologic formation, fractures in the wellbore or completion cement, and many other pieces of information about a formation. If such well log data is acquired during drilling operations (e.g., logging-while-drilling or measurement-while-drilling), then the information may be used to make adjustments to drilling parameters in real-time. Such adjustments may include rate of penetration (ROP), a bottom-hole circulating pressure, one or more drilling directions, altering mud weight, the amount of weight-on-bit, and many others drilling parameters.

In some embodiments, acoustic sensors may be installed in a drilling fluid circulation system of a drilling system (200) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

The control system (244) may be coupled to the sensor assembly (223) in order to perform various program functions for up-down steering and left-right steering of the drill bit (224) through the wellbore (216). More specifically, the control system (244) may include hardware and/or software with functionality for geosteering a drill bit through a formation in a lateral well using sensor signals, such as drilling acoustic signals or resistivity measurements. For example, the formation may be a reservoir region, such as a pay zone, bed rock, or cap rock.

Turning to geosteering, geosteering may be used to position the drill bit (224) or drill string (215) relative to a boundary between different subsurface layers (e.g., overlying, underlying, and lateral layers of a pay zone) during drilling operations. In particular, measuring rock properties during drilling may provide the drilling system (200) with the ability to steer the drill bit (224) in the direction of desired hydrocarbon concentrations. As such, a geo steering system may use various sensors located inside or adjacent to the drill string (215) to determine different rock formations within a wellbore's path. In some geosteering systems, drilling tools may use resistivity or acoustic measurements to guide the drill bit (224) during horizontal or lateral drilling.

Figure 2B:
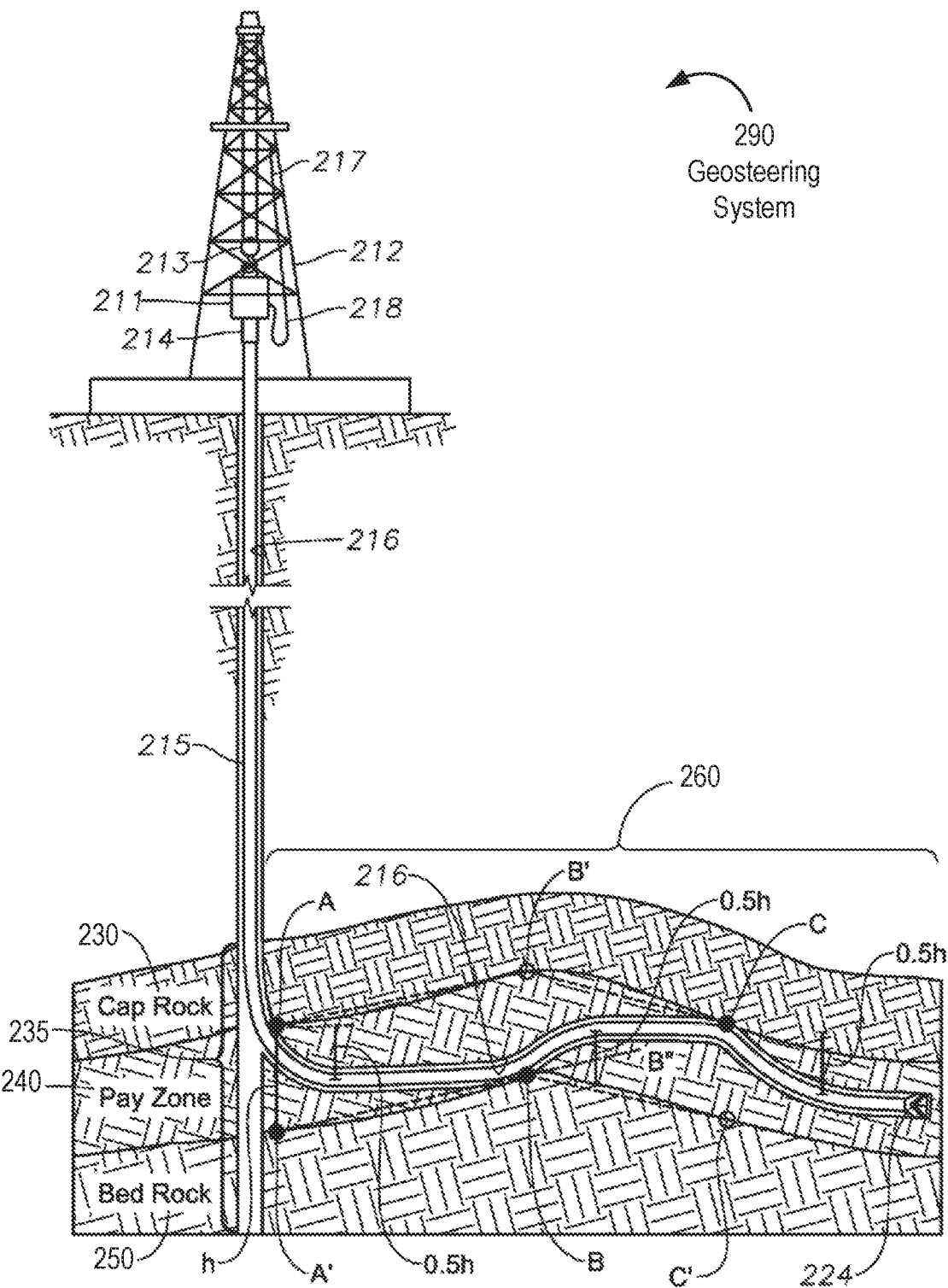

Turning to FIG. 2B, FIG. 2B illustrates some embodiments for steering a drill bit through a lateral pay zone using a geosteering system (290). As shown in FIG. 2B, the geosteering system (290) may include the drilling system (200) from FIG. 2A. In particular, the geosteering system (290) may include functionality for monitoring various sensor signatures (e.g., an acoustic signature from acoustic sensors) that gradually or suddenly change as a well path traverses a cap rock (230), a pay zone (240), and a bed rock (250). Because of the sudden change in lithology between the cap rock (230) and the pay zone (240), for example, a sensor signature of the pay zone (240) may be different from the sensor signature of the cap rock (230). When the drill bit (224) drills out of the pay zone (240) into the cap rock (230), a detected amplitude spectrum of a particular sensor type may change suddenly between the two distinct sensor signatures. In contrast, when drilling from the pay zone (240) downward into the bed rock (250), the detected amplitude spectrum may gradually change.

During the lateral drilling of the wellbore (216), preliminary upper and lower boundaries of a formation layer's thickness may be derived from a geophysical survey and/or an offset well obtained before drilling the wellbore (216). If a vertical section (235) of the well is drilled, the actual upper and lower boundaries of a formation layer (i.e., actual pay zone boundaries (A, A')) and the pay zone thickness (i.e., A to A') at the vertical section (235) may be determined. Based on this well data, an operator may steer the drill bit (224) through a lateral section (260) of the wellbore (216) in real time. In particular, a logging tool may monitor a detected sensor signature proximate the drill bit (224), where the detected sensor signature may continuously be compared against prior sensor signatures, e.g., of the cap rock (230), pay zone (240), and bed rock (250), respectively. As such, if the detected sensor signature of drilled rock is the same or similar to the sensor signature of the pay zone (240), the drill bit (224) may still be drilling in the pay zone (240). In this scenario, the drill bit (224) may be operated to continue drilling along its current path and at a predetermined distance ($0.5h$) from a boundary of a formation layer. If the detected sensor signature is same as or similar to the prior sensor signatures of the cap rock (230) or the bed rock (250), respectively, then the control system (244) may determine that the drill bit (224) is drilling out of the pay zone (240) and into the upper or lower boundary of the pay zone (240). At this point, the vertical position of the drill bit (224) at this lateral position within the wellbore (216) may be determined and the upper and lower boundaries of the pay zone (240) may be updated, (for example, positions B and C in FIG. 2B). In some embodiments, the vertical position at the opposite boundary may be estimated based on the predetermined thickness of the pay zone (240), such as positions B' and C'.

Returning to FIG. 1, geosteering may be used to position the drill bit or drill string of the drilling system (110) relative to a boundary between different subsurface layers (e.g., overlying, underlying, and lateral layers of a pay zone) during drilling operations. In particular, measuring rock properties during drilling may provide the drilling system (110) with the ability to steer the drill bit in the direction of desired hydrocarbon concentrations. As such, a geosteering system may use various sensors located inside or adjacent to the drill string to determine different rock formations within a well path. In some geosteering systems, drilling tools may use resistivity or acoustic measurements to guide the drill bit during horizontal or lateral drilling.

Returning to a reservoir simulator (160), a reservoir simulator (160) may include hardware and/or software with functionality for generating one or more machine-learning models (170) for use in analyzing the formation (106). For example, the reservoir simulator (160) may store well logs (140) and data regarding core samples (150), and further analyze the well log data, the core sample data, seismic data, and/or other types of data to generate and/or update one or more machine-learning models (170) and/or one or more geological models (175). Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include decision trees and neural networks. In some embodiments, the reservoir simulator (160) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Figure 3:
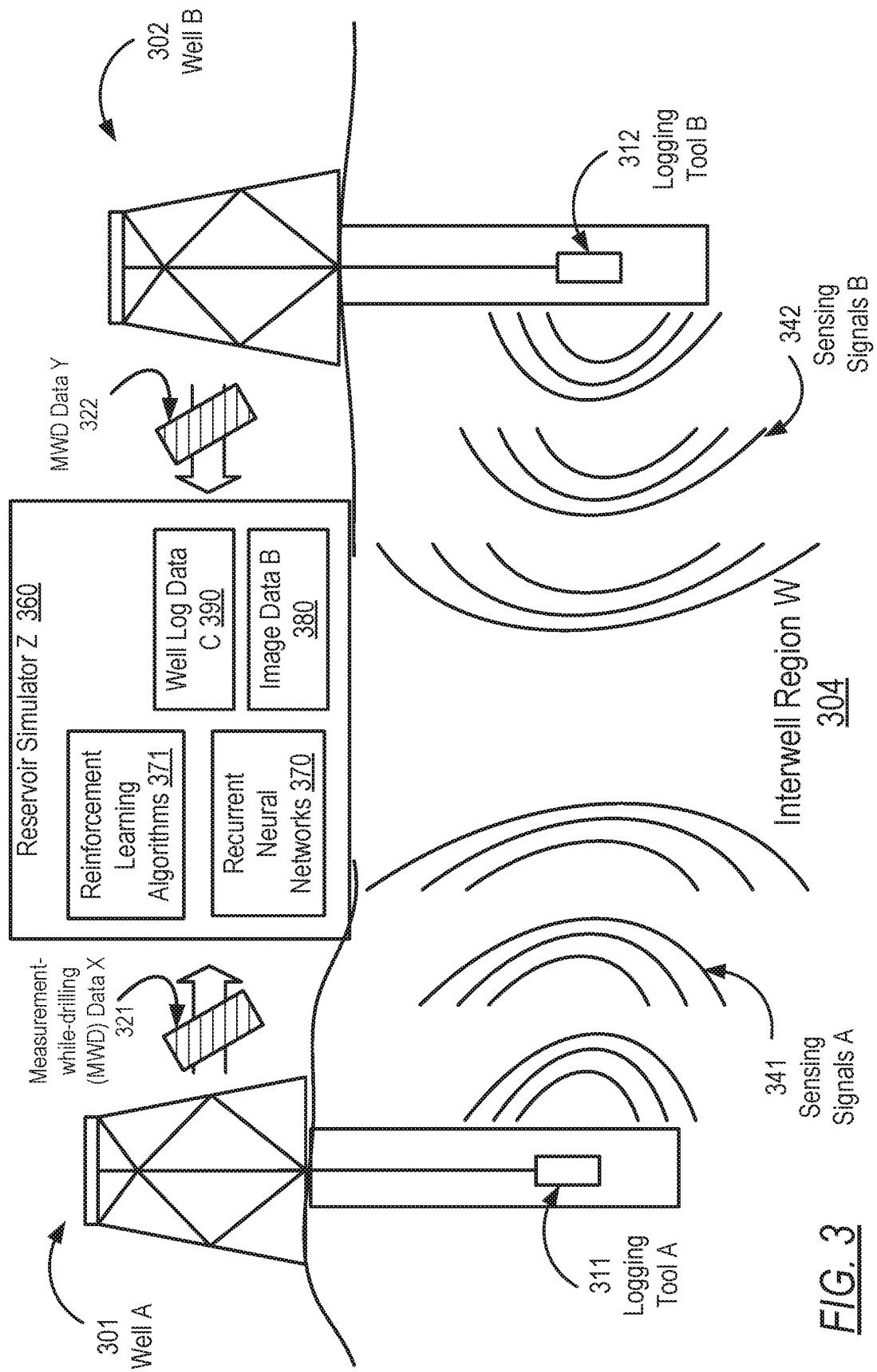

Turning to FIG. 3, FIG. 3 illustrates a system for imaging an interwell region in accordance with one or more embodiments. In FIG. 3, a well A (301) includes a logging tool A (311) that produces various sensing signals A (341) to image an interwell region W (304) of a formation. For example, the sensing signals A (341), may be acoustic or electrical signals for generating acoustic logs or resistivity logs, respectively. While logging tool A (311) is imaging the interwell region W (304), well B (302) is using a logging tool B (312) to image the interwell region W (304) also. Thus, logging tool A (311) and logging toll B (312) may be used substantially simultaneously while both well A (301) and well B (302) are being drilled. As shown in FIG. 3, well A (301) generates measurement-while-drilling (MWD) data X (321) that is transmitted to reservoir simulator Z (360), while well B (302) generates MWD data Y (320) that is also sent to the reservoir simulator Z (360). Accordingly, the reservoir simulator Z (360) may obtain well log data C (390) regarding wells (301, 302) for the interwell region W (304).

Keeping with FIG. 3, by obtaining well log data from two or more wells in relative close proximity, interference in MWD data X (321) and MWD data Y (322) may be similar due to similar drilling operations and/or well paths through similar types of formations in the subsurface. Thus, the interference and coherence in various sensing signals for two or more wells proximate an interwell region may be similar in cases of a specific geological context. By using a recurrent neural network (e.g., one of the recurrent neural networks (370)), for example, the reservoir simulator Z (360) may filter the interference from the well log data C (390) to obtain adjusted log data, such as adjusted acoustic data or adjusted resistivity data. The adjusted log data may then be used to produce image data B (380) with increased coherence. In other words, the image data B (380) may describe the interwell region W (304) with less noise than the raw MWD data X (321) and/or the raw MWD data Y (322). In one or more embodiments, image data (380) may correspond to information regarding geological, geochemical, and other properties relating to a formation or subsurface. Accordingly, image data may refer to imaging reservoir characteristics, and may not necessarily relate to a pixeled image of a region in a subsurface.

Furthermore, a machine-learning algorithm (e.g., one of the reinforcement learning algorithms (371)) may be used to improve performance of the respective recurrent neural network using acquired well log data over time. While FIG. 3 is shown using MWD technologies, embodiments are also contemplated that use logging-while-drilling (LWD) data in addition or in place of MWD data. For example, LWD tools in a drill string may automatically transfer LWD to a well site's surface and automatically analyzed and cross-correlated with other well log data for use in determining logging parameters and/or drilling parameters among multiple wells.

Turning to recurrent neural networks, a recurrent neural network (RNN) may perform a particular task repeatedly for multiple data elements in an input sequence (e.g., a sequence of well log data), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

Furthermore, the size of the LSTM network may depend on the specific application. For simple geological layers, a limited number of hidden layers may be needed. For complex geological structures, a large number of hidden layers may be used to deal with the varying settings and complexity of the reservoir. For more information on LSTM networks, see FIG. 5 and the accompanying description below.

Turning to reinforcement learning, a reinforcement learning algorithm may train a machine-learning model to make a sequence of decisions. For example, a recurrent neural network may be trained by a reinforcement learning algorithm to achieve a predetermined objective in a possibly uncertain, potentially complex environment. In particular, the predetermined objective may be an optimal set of logging parameters for a logging tool in a wellbore, an optimal set of drilling parameters for producing a particular well path, and/or an accurate geological model of one or more subterranean formations. Thus, a reinforcement learning algorithm may employ a trial-and-error procedure to determine a solution to a complex problem. For example, a reinforcement learning algorithm may include a reward function that teaches a recurrent neural network to follow certain rules, while still allowing the machine-learning model to retain information learned from well log data. In training a recurrent neural network, some embodiments include storing multiple recurrent networks, e.g., a pretrained RNN that learns to predict well log data and a reward RNN that is trained to predict the rules for the pre-trained RNN.

In some embodiments, a deep reinforcement learning algorithm operates in combination with an LSTM network. The deep reinforcement learning algorithm may be used to optimize the position and direction of a well path in order to improve interwell LWD imaging of a formation. The size of the hidden layers updated by a reinforcement learning algorithm may depend on the complexity of the subsurface structure. The more complex the subsurface structure is, the more complex the LSTM network structure may be to predict image data accurately within an interwell region.

Returning to FIG. 1, a well path of a wellbore (104) may be updated by the control system (114) using a geological model (e.g., one of the geological models (175)). For example, a control system (114) may communicate geosteering commands to the drilling system (110) based on well data updates that are further adjusted by the reservoir simulator (160) using a geological model. As such, the control system (114) may generate one or more control signals for drilling equipment (or a logging system may generate for logging equipment) based on an updated well path design and/or a geological model.

While FIGS. 1, 2A, 2B, and 3 show various configurations of components, other configurations may be used without departing from the scope of the disclosure. For example, various components in FIGS. 1, 2A, 2B, and 3 may be combined to create a single component. As another example, the functionality performed by a single component may be performed by two or more components. Furthermore, while FIG. 3 shows two adjacent wells (a dual-well drilling operation), those skilled in the art will appreciate that embodiments discussed above with respect to FIGS. 1-3 may be performed with multiple (more than two) wells being simultaneously drilled in a geological region of interest.

Figure 4:
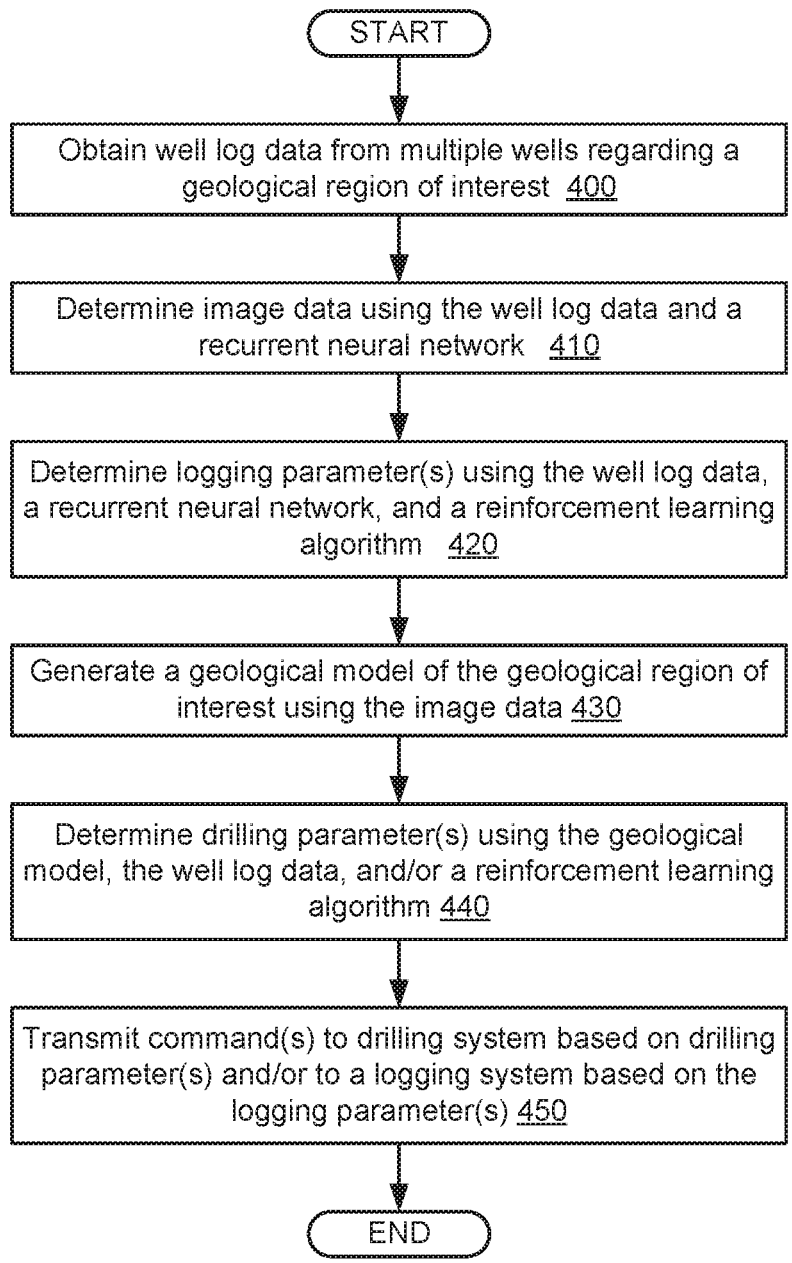
FIG. 4 shows a flowchart in accordance with one or more embodiments.

Turning to FIG. 4, FIG. 4 shows a flowchart in accordance with one or more embodiments. Specifically, FIG. 4 describes a general method that uses artificial intelligence to determine adjusted well log data based on data from two or more wells. One or more blocks in FIG. 4 may be performed by one or more components (e.g., reservoir simulator (160)) as described in FIGS. 1, 2A, 2B, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, well log data is obtained from multiple wells regarding a geological region of interest in accordance with one or more embodiments. A geological region of interest may be a portion of a geological area or volume that includes one or more formations of interest desired or selected for analysis, e.g., for determining location of hydrocarbons or for reservoir development purposes. In particular, the geological region of interest may include one or more interwell regions that are being imaged by logging tools at multiple wells. In some embodiments, the well log data is acquired using a sonic logging tool or ultrasonic logging tool that generates acoustic logs or sonic logs. In another embodiments, the well log data may include resistivity logs acquired using a resistivity logging tool. However, other embodiments are contemplated that use various sensing technologies that may be coupled to a drill string or close to a drill bit.

Furthermore, the well log data may be acquired while drilling one or more wells substantially simultaneously. For example, some well log data may be acquired at a time lag or time offset from other well logs acquired by one or more other wells. In some embodiments, one or more wells may have been drilled previously than a currently drilled well. As such, a reservoir simulator may analyze this legacy well data as if the legacy well data was collected simultaneously with a well being drilled in real-time with the analysis. For example, different well logs may be synchronized for analysis using true vertical depth, location within a well path, and/or time stamps.

In Block 410, image data is determined using well log data and a recurrent neural network in accordance with one or more embodiments. In some embodiments, a machine-learning model such as a recurrent neural network performs data interpretation on the original well log data based on one or more artificial intelligence technologies. After being trained using a training algorithm, for example, a recurrent neural network may predict one or more classes from well log data that includes greater coherency than inversion techniques based on original well log data alone. Thus, a recurrent neural network may perform a joint inversion of well log data for an interwell region. This joint inversion may produce image data regarding an interwell region by determining reservoir and/or geological properties of the respective interwell region. Thus, a recurrent neural network may use well log data from multiple wells as inputs to provide real-time updates of an interwell geological model, e.g., a model that describes the reservoir rock structure and fluid distribution of the geological region of interest. In some embodiments, a reservoir simulator uses a recurrent neural network to perform data de-noising or an uncertainty reduction on well log data to produce adjusted well log data. In some embodiments, the recurrent neural network is a long short-term memory (LSTM) network. For example, LSTM networks may incorporate multivariate inputs for use in the LSTM model. Thus, two or more one-dimensional well log data sequences (e.g., one well log data sequence per well) may be provided as a separate input sequence to the machine-learning model.

Figure 5:
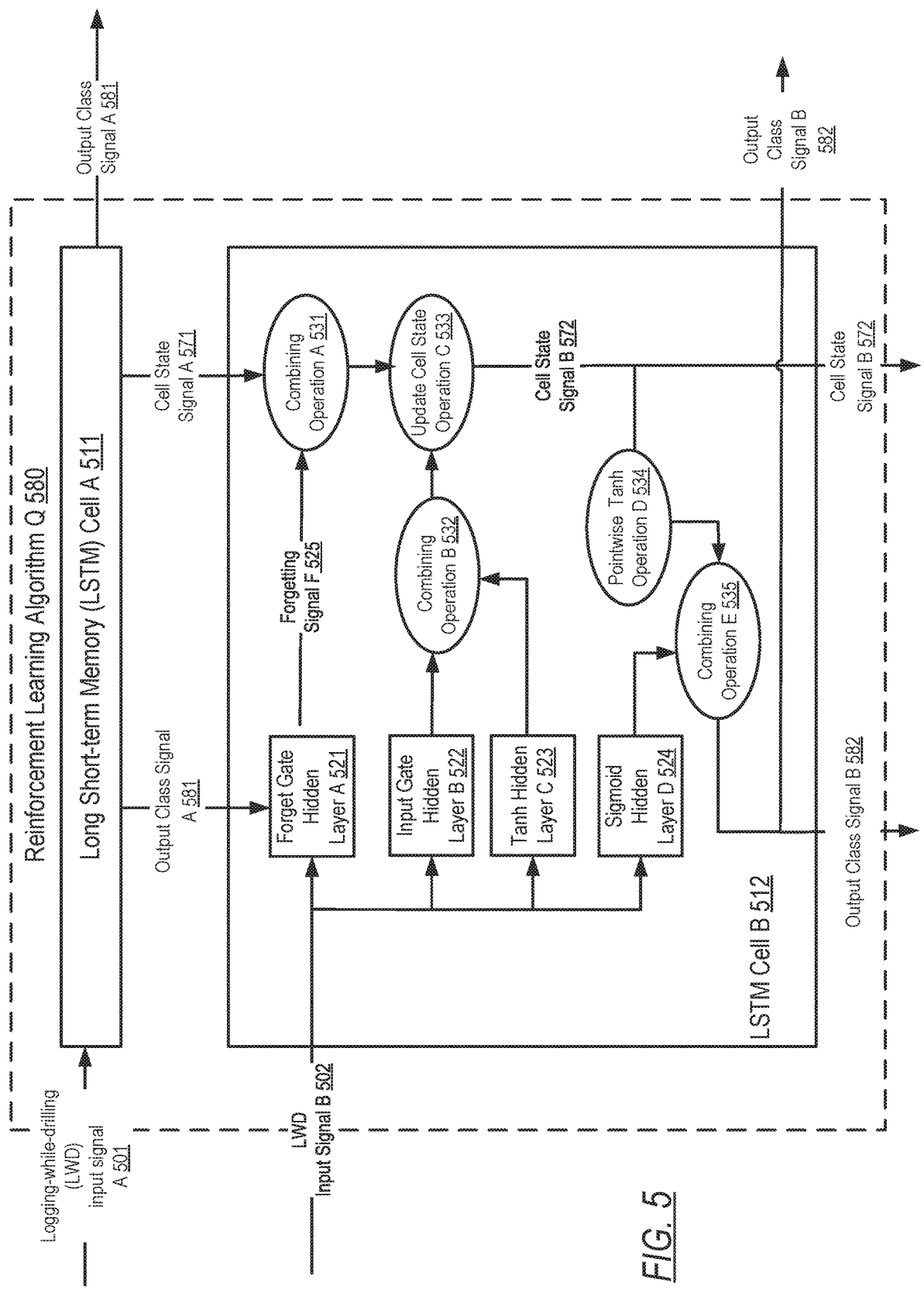
FIGS. 5 and 6 show examples in accordance with one or more embodiments.

Turning to FIG. 5, FIG. 5 provides an example of using an LSTM network with logging-while-drilling (LWD) data in accordance with one or more embodiments. The following example is for explanatory purposes only and not intended to limit the scope of the disclosed technology. As described above, multiple one-dimensional well log data sequences may be provided as separate input sequences to an LSTM network, but for convenience, only a single well log data input sequence is shown in FIG. 5. In FIG. 5, various LSTM cells (e.g., LSTM cell A (511), LSTM cell B (512)) obtained various LWD input signals (e.g., LWD input signal A (501), LWD input signal B (502)) to generate various output signals (e.g., output class signal A (581), output class signal B (582)). As shown, a respective LSTM cell in FIG. 5 obtains an output class signal and a cell state signal (e.g., cell state signal A (571), cell state signal B (572)) from a previous LSTM cell along with an LWD input signal. Moreover, a respective LSTM cell includes various hidden layers (e.g., forget gate hidden layer A (521), input gate hidden layer B (522), a tan h hidden layer C (523), and a sigmoid hidden layer D (524)) along with various pointwise operators (e.g., a combining operation A (531), a combining operation B (532), an update cell state operation C (533), a pointwise tan h operation D (534), and a combining operation E (535)). For example, a cell state signal A (571) may correspond to a vector of information, where a portion of the portion is deleted in response to a forgetting signal F (525) that is generated using an LWD input signal B (502) and a previous output signal (i.e., output class signal A (581)). When the cell state signal A (571) and the forgetting signal F (525) are added together in the combining operation A (531), the filtered resulting signal may then be updated at updated cell state operation C (533) to produce a new cell state signal (i.e., cell state signal B (572)) for transmission to the next LSTM cell. In some embodiments, the output of the LSTM network is variable. For example, the output signal may correspond to logging parameters as well as an interwell image based on well log data. Moreover, the output class of an LSTM network may be a confidence interval.

Returning to FIG. 4, in Block 420, one or more logging parameters are determined using well log data, a recurrent neural network, and a reinforcement learning algorithm in accordance with one or more embodiments. In particular, a reservoir simulator or a control system may use a real-time acquisition of logging data (e.g., from well logs or drilling logs) to automatically adjust one or more logging parameters for one or more logging tools. For example, logging parameters may include various amplitudes, phase shift values, and/or different frequencies for operating one or more logging tools. Using a recurrent neural network in connection with a reinforcement learning algorithm, a control system or a reservoir simulator may determine one or more optimal logging parameters for transmission through an interwell region.

In Block 430, a geological model of a geological region of interest is generated using image data in accordance with one or more embodiments. For example, a reservoir simulator may generate or update a geological model by cross-correlating well log data from different wells. The cross-correlated data may form an overall image of one or more formations, accordingly. As such, a geological model may be updated for an interwell geological model in real time by constraining the analysis to a specific area (e.g., an interwell region) of an existing geological model. In addition to LWD data or MWD data, a reservoir simulator may use prior well logs and productivity data, for example, to update a geological model.

In Block 440, one or more drilling parameters are determined using a geological model and/or adjusted well log data in accordance with one or more embodiments. In some embodiments, a reservoir simulator or a control system may forecast various drilling parameters and geosteering operations using a recurrent neural network. Likewise, past drilling parameter adjustments may be used to train a machine-learning model in order to adapt drilling parameters in real-time to a specific geological context using a reinforcement learning method. Likewise, optimized drilling parameters may be determined using a recurrent neural network in order to optimize a drilling process, such as a well path through a formation.

In Block 450, one or more commands are transmitted to a drilling system based on one or more drilling parameters and/or to a logging system based on one or more logging parameters in accordance with one or more embodiments. Based on the output of one or more recurrent neural networks, a command may be fashioned correspond to a particular parameter value. Thus, the command may be a control signal, e.g., generated by a control system, or a network message that adjusts one or more drilling parameters and/or logging parameters. For example, a command may be transmitted from a reservoir simulator or control system on a surface of a well site to drilling equipment or logging equipment downhole. The drilling system similar to the drilling system (110) described above in FIG. 1 and the accompanying description. In some embodiments, one or more commands may implement one or more geosteering operations. For more information on geosteering techniques, see FIGS. 1, 2A, and/or 2B and the accompanying description above.

Figure 6:
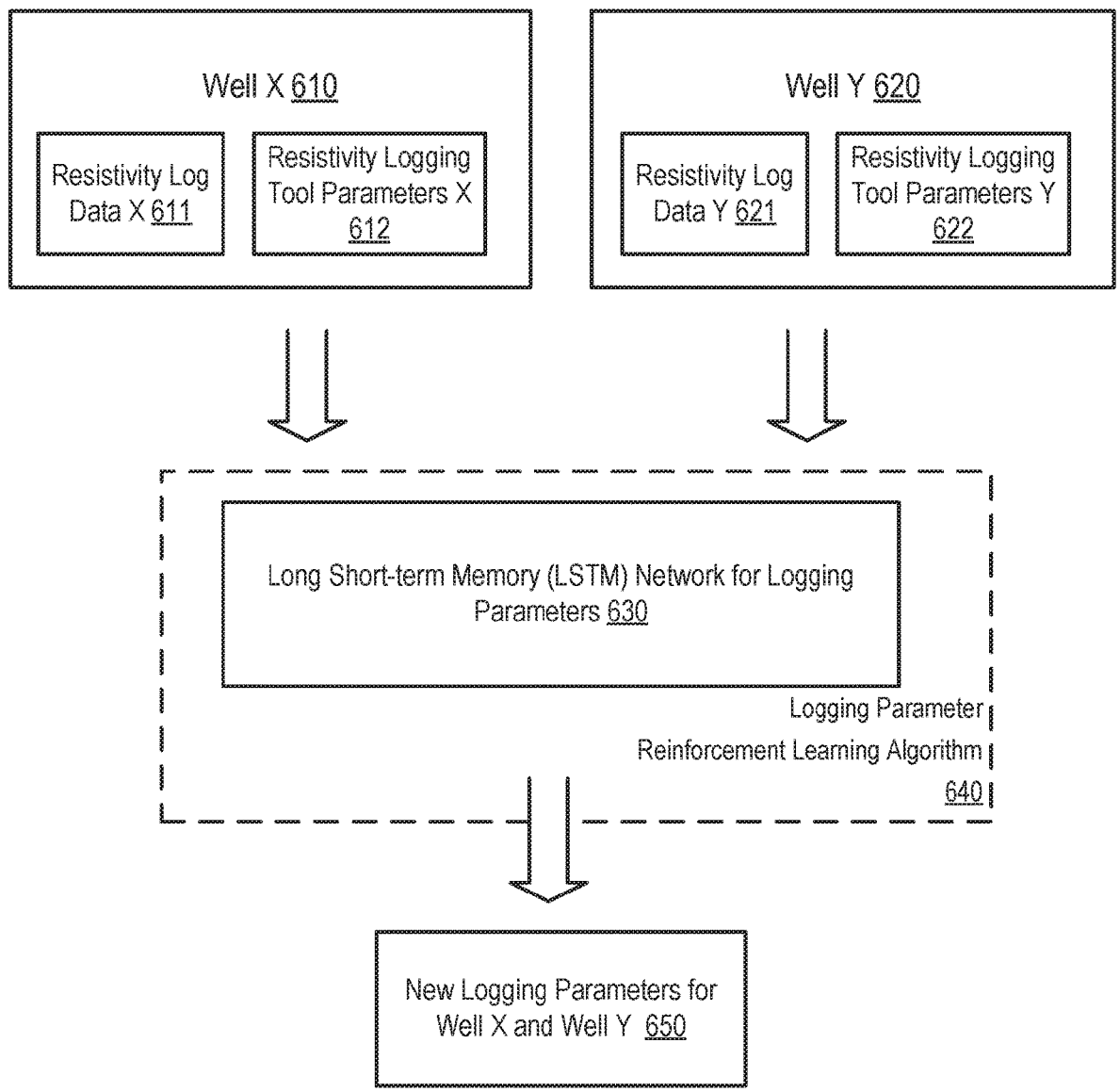

Turning to FIG. 6, FIG. 6 provides an example of optimizing logging parameters in accordance with one or more embodiments. The following example is for explanatory purposes only and not intended to limit the scope of the disclosed technology. In FIG. 6, FIG. 6 shows two wells, well X (610) and well Y (620). With respect to well X (610), resistivity log data X (611) is acquired using resistivity logging tool parameters X (612). With respect to well Y (620), resistivity log data Y (621) is acquired using resistivity logging tool parameters Y (622). Because both wells (610, 620) are being drilling substantially simultaneously in similar geological contexts, similar interference is found in both the resistivity log data X (611) and the resistivity log data Y (621). Accordingly, a logging system (not shown) operates a recurrent neural network, i.e., the LSTM network for logging parameters (630), that obtains the resistivity log data X (611) and the resistivity log data Y (621) as inputs. Using a logging parameter reinforcement learning algorithm (640), the logging system has been able to optimize the LSTM network (630) to predict optimize logging parameters for resistivity logging tools. Thus, based on the resistivity log data (611, 621), the LSTM network (630) determines new logging parameters for well X and well Y (650). Accordingly, the logging system transmits the new logging parameters (650) to respective resistivity logging tools for immediate use.

Embodiments disclosed herein allow for advanced real-time communications between dual LWD tools in multiple wells or simultaneous use of LWD information for data analytics analysis. The tool may improve interwell imaging and formation evaluation, support geosteering and well placement, optimize reservoir contact, and/or ultimately increases recovery. In one or more embodiments, the tool may be of particular interest for long horizontal wells, which require to geo-navigate in thin reservoir layers. One of the advantageous of the method may be that the more well logs and subsurface information that is available, the better and more precise the interpretation can be. The technique disclosed herein also may allow the interwell resistivity mapping in real-time during the drilling process and enables increasing the reservoir contact and recovery in the interwell area. The interwell information gathered using embodiments of this disclosure may be useful for rock formations that are intended to be hydraulically fracked in the context of unconventional reservoir development.

Figure 7:
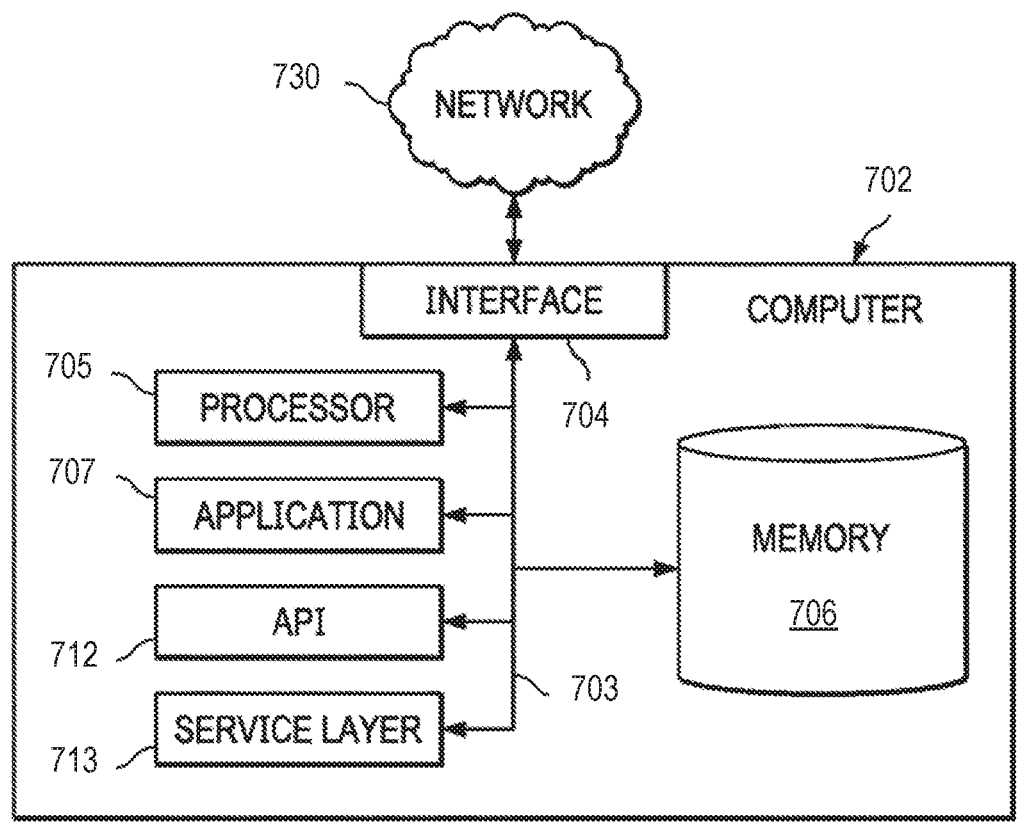
FIG. 7 shows a computer system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to an implementation. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705).

Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
obtaining, by a computer processor, well log data regarding a geological region of interest, wherein the well log data corresponds to logging-while-drilling (LWD) measurements or measurement-while-drilling (MWD) measurements acquired from a plurality of wellbores,
wherein the well log data comprise first acoustic data and second acoustic data that are acquired simultaneously from a first wellbore and a second wellbore among the plurality of wellbores;
generating, by the computer processor, image data regarding the geological region of interest using the well log data and a first recurrent neural network,
wherein the image data describes an interwell region within the geological region of interest,
wherein the first recurrent neural network filters interference from the first acoustic data and the second acoustic data to produce adjusted well log data;
determining, using a second recurrent neural network and a reinforcement learning algorithm, one or more logging parameters based on the well log data acquired from the plurality of wellbores; and
adjusting, based on the adjusted well log data and using a command, one or more logging parameters regarding a logging tool that generates a subset of the well log data in the wellbore,
wherein the one or more logging parameters comprise an amplitude, a frequency, or a phase shift of an electrical sensing signal that is produced by the logging tool, and
determining, by the computer processor, one or more drilling parameters for a wellbore among the plurality of wellbores in real-time using the image data,
wherein the one or more drilling parameters are determined while the well log data is being acquired in the wellbore; and
transmitting, by the computer processor and based on the one or more drilling parameters and/or the one or more logging parameters, a command to a drilling system and/or a logging system coupled to the wellbore.

2. The method of claim 1,
wherein the first recurrent neural network comprises a plurality of long short-term memory (LSTM) cells,
wherein a respective LSTM cell among the plurality of LSTM cells generates a respective output class signal, and
wherein the respective LSTM cell obtains a previous output class signal and a cell state signal from a previous LSTM cell among the plurality of LSTM cells.

3. The method of claim 2,
wherein the respective output class signal is used by a reservoir simulator to generate the image data.

4. The method of claim 1, further comprising:
generating a geological model using the image data; and
determining a location of one or more hydrocarbon deposits in the geological region using the geological model.

5. The method of claim 1, further comprising:
adjusting a well path through the geological region of interest using the image data,
wherein the wellbore is a portion of the well path.

6. The method of claim 1,
wherein the one or more drilling parameters are determined using a deep reinforcement learning algorithm, and
wherein the one or more drilling parameters comprise a rate of penetration, a bottom-hole circulating pressure, or a predetermined amount of weight-on-bit.

7. A system, comprising:
a logging system coupled to a plurality of logging tools;
a drilling system coupled to the logging system and a first wellbore; and a reservoir simulator comprising a computer processor, wherein the reservoir simulator is coupled to the logging system and the drilling system, the reservoir simulator comprising functionality for:
obtaining well log data regarding a geological region of interest, wherein the well log data corresponds to logging-while-drilling (LWD) measurements or measurement-while-drilling (MWD) measurements acquired from a plurality of wellbores comprising the first wellbore,
wherein the well log data comprise first acoustic data and second acoustic data that are acquired from a first wellbore and a second wellbore among the plurality of wellbores;
generating image data regarding the geological region of interest using the well log data and a first recurrent neural network$_2$
wherein the image data describes an interwell region within the geological region of interest, wherein the first recurrent neural network filters interference from the first acoustic data and the second acoustic data to produce adjusted well log-data;

determining, using a second recurrent neural network and a reinforcement learning algorithm, one or more logging parameters based on the well log data acquired from the plurality of wellbores; and adjusting, based on the adjusted well log data and using a command, one or more logging parameters regarding a logging tool that generates a subset of the well log data in the wellbore, wherein the one or more logging parameters comprise an amplitude, a frequency, or a phase shift of an electrical sensing signal that is produced by the logging-tool, and determining one or more drilling parameters for the first wellbore in real-time using the image data, wherein the one or more drilling parameters are determined while the well log data is being acquired in the first wellbore; and transmitting, based on the one or more drilling parameters and/or the one or more logging parameters, a command to a drilling system and/or a logging system coupled to the first wellbore.

8. The system of claim 7,
wherein the plurality of logging tools comprise a first sonic logging tool that generates first acoustic data using a plurality of sensing signals, and
wherein the first recurrent neural network generates adjusted acoustic data using the first acoustic data and second acoustic data from a second sonic logging tool in a second wellbore among the plurality of wellbores.

9. The system of claim 7,
wherein the first recurrent neural network comprises a plurality of long short-term memory (LSTM) cells,
wherein a respective LSTM cell among the plurality of LSTM cells generates a respective output class signal, and
wherein the respective LSTM cell obtains a previous output class signal and a cell state signal from a previous LSTM cell among the plurality of LSTM cells.

10. The system of claim 7, wherein the reservoir simulator further comprises functionality for:
adjusting a well path through the geological region of interest using the image data,
wherein the first wellbore is a portion of the well path.

11. The system of claim 7,
wherein the one or more drilling parameters are determined using a deep reinforcement learning algorithm, and
wherein the one or more drilling parameters comprise a rate of penetration, a bottom-hole circulating pressure, or a predetermined amount of weight-on-bit.

12. A non-transitory computer readable medium storing instructions executable by a computer processor, the instructions comprising functionality for:
obtaining well log data regarding a geological region of interest, wherein the well log data corresponds to logging-while-drilling (LWD) measurements or measurement-while-drilling (MWD) measurements acquired from a plurality of wellbores, wherein the well log data comprise first acoustic data and second acoustic data that are acquired simultaneously from a first wellbore and a second wellbore among the plurality of wellbores;

generating image data regarding the geological region of interest using the well log data and a first recurrent neural network, wherein the image data describes an interwell region within the geological region of interest, wherein the first recurrent neural network filters interference from the first acoustic data and the second acoustic data to produce adjusted well log-data;

determining, using a second recurrent neural network and a reinforcement learning algorithm, one or more logging parameters based on the well log data acquired from the plurality of wellbores; and adjusting, based on the adjusted well log data and using a command, one or more logging parameters regarding a logging tool that generates a subset of the well log data in the wellbore, wherein the one or more logging parameters comprise an amplitude, a frequency, or a phase shift of an electrical sensing signal that is produced by the logging tool, and determining one or more drilling parameters for a wellbore among the plurality of wellbores in real-time using the image data, wherein the one or more drilling parameters are determined while the well log data is being acquired in the wellbore; and transmitting, based on the one or more drilling parameters and/or the one or more logging parameters, a command to a drilling system and/or a logging system coupled to the wellbore.

13. The non-transitory computer readable medium of claim 12,
wherein the first recurrent neural network comprises a plurality of long short-term memory (LSTM) cells,
wherein a respective LSTM cell among the plurality of LSTM cells generates a respective output class signal, and
wherein the respective LSTM cell obtains a previous output class signal and a cell state signal from a previous LSTM cell among the plurality of LSTM cells.

14. The non-transitory computer readable medium of claim 12, wherein the instructions further comprise functionality for:
adjusting a well path through the geological region of interest using the image data,
wherein the wellbore is a portion of the well path.

15. The non-transitory computer readable medium of claim 12,
wherein the one or more drilling parameters are determined using a deep reinforcement learning algorithm, and
wherein the one or more drilling parameters comprise a rate of penetration, a bottom-hole circulating pressure, or a predetermined amount of weight-on-bit.

* * * * *